(12) United States Patent
Madsen et al.

(10) Patent No.: US 8,426,018 B2
(45) Date of Patent: Apr. 23, 2013

(54) LAYER OF MATERIAL FOR UPTAKE OF EXCESS ADHESIVE

(75) Inventors: Kristian Lehmann Madsen, Fredericia (DK); Morten Olesen, Lunderskov (DK)

(73) Assignee: LM Glasfiber A/S, Lunderskov (DK)

( * ) Notice: Subject to any disclaimer, the term of this patent is extended or adjusted under 35 U.S.C. 154(b) by 912 days.

(21) Appl. No.: 11/992,118

(22) PCT Filed: Sep. 14, 2006

(86) PCT No.: PCT/DK2006/000505
§ 371 (c)(1), (2), (4) Date: Mar. 14, 2008

(87) PCT Pub. No.: WO2007/048408
PCT Pub. Date: May 3, 2007

(65) Prior Publication Data
US 2009/0226702 A1    Sep. 10, 2009

(30) Foreign Application Priority Data

Sep. 19, 2005   (DK) ................ 2005 01302

(51) Int. Cl.
| | |
|---|---|
| *B32B 7/12* | (2006.01) |
| *B32B 3/26* | (2006.01) |
| *B32B 3/06* | (2006.01) |
| *B32B 5/24* | (2006.01) |
| *B32B 3/16* | (2006.01) |
| *B32B 5/18* | (2006.01) |

(52) U.S. Cl.
USPC ................ 428/317.1; 428/317.3; 428/304.4; 428/304.6; 428/311.11; 428/343; 428/77; 442/221; 442/223; 442/315; 442/370

(58) Field of Classification Search ............... 428/317.1, 428/317.3, 304.4, 304.6, 311.11, 343, 77; 442/221, 223, 315, 370
See application file for complete search history.

(56) References Cited

U.S. PATENT DOCUMENTS

| | | | |
|---|---|---|---|
| 2,589,786 A | 3/1952 | Engel et al. | |
| 4,009,065 A * | 2/1977 | Mikulas | 156/159 |
| 4,169,184 A * | 9/1979 | Pufahl | 428/337 |
| 4,737,548 A * | 4/1988 | Kojima et al. | 525/193 |
| 2001/0020515 A1* | 9/2001 | Shibata et al. | 156/329 |

(Continued)

FOREIGN PATENT DOCUMENTS

| | | |
|---|---|---|
| DK | 200200557 | 10/2003 |
| EP | 0 491 645 A1 | 6/1992 |

(Continued)

*Primary Examiner* — Callie Shosho
*Assistant Examiner* — Samir Shah
(74) *Attorney, Agent, or Firm* — Nath, Goldberg & Meyer; Jerald L. Meyer; Sanjana Mangalagiri

(57) ABSTRACT

A method of joining at least two parts by adhesion is provided, the method including arrangement of a porous layer in the adhesive joint for taking up excess adhesive outside the adhesive joint as such. An element is also provided—including in particular a blade for a wind turbine—which is combined by adhesion of several parts, and wherein a porous layer is at least partially comprised in and at least partially protrudes from the adhesive joint between the parts and takes up excess adhesive outside the adhesive joint. The porous layer may be of a mesh-like structure or may have the structure of a sponge and may furthermore be entirely or partially pre-impregnated with adhesive.

5 Claims, 5 Drawing Sheets

U.S. PATENT DOCUMENTS

2003/0161984 A1* 8/2003 Bries et al. .................. 428/40.1
2004/0023581 A1   2/2004 Bersuch et al.
2007/0036659 A1*  2/2007 Hibbard ....................... 416/233

FOREIGN PATENT DOCUMENTS

| | | |
|---|---|---|
| EP | 0 639 042 A1 | 2/1995 |
| JP | 62050124 | 3/1987 |
| JP | 8041917 | 2/1996 |
| JP | 11090986 | 4/1999 |
| WO | WO 03/046394 A1 | 6/2003 |
| WO | WO 03/087572 A1 | 10/2003 |
| WO | WO2004076852 * | 9/2004 |

* cited by examiner

LAYER OF MATERIAL FOR UPTAKE OF EXCESS ADHESIVE

The invention relates to a method of joining at least two parts by adhesion and an element comprising at least two adhesive parts, including in particular a blade for a wind turbine.

BACKGROUND

In order to ensure strong adhesion of parts in a structure, it is important to apply sufficient adhesive to the adhesive faces. Accordingly, most often a certain amount of excess adhesive flows out from all sides of the adhesive joint when the parts are pressed towards each other. Large tolerances on the constituent elements and hence comparatively large variations in the final size of the adhesive joint also contribute to making it difficult to determine the requisite and sufficient amount of adhesive for obtaining a strong joint, which is solved in the simplest and most expedient way by applying adhesive abundantly. Usually the out-flowing adhesive is removed and the adhesive joint is smoothened both for aesthetic considerations and often also for various functional considerations. This can be done either by simply scraping or wiping off the adhesive prior to it having set completely or by removing it mechanically, eg by sanding.

When joining completely or partially closed structures or structures with particular geometries by adhesion, however, it may be difficult or even impossible to remove excess adhesive pressed out of the joint. This is the case eg for blades for wind turbines that consist of blade shells that are adhered to each other with internal bracing beams. Here the excess adhesive is on the inside of the blade in large "burrs". Unless they are removed, they will, once the blade is taken into use, to some extent brake off and rattle around interiorly of the blade. This is undesirable in itself as it entails generation of much noise to the nuisance of the environment surrounding the wind turbine. Over time, the adhesive lumps are pulverised by being thrown around, but they are then found to connect with humidity and water penetrating into the blade and form large lumps that, on the one hand, clog drainage openings and, on the other, impart severe impact forces on the interior parts of the blade during rotation of the blade.

In order to avoid this, it is therefore desirable to remove the excess adhesive pressed out of the adhesive joints when the blade is assembled. This can be done manually some distance into the blade, which is, however, on the one hand a labour- and time-intensive process and, on the other, it is not ideal for working environment considerations. Alternatively, so-called adhesive traps, looking like long narrow gutters, can be mounted inside the blade into which the adhesive runs during the assembly, and which are optionally subsequently pulled out of the blade. However, this is a cumbersome and time-intensive process.

In DK 175718 the interior bracing beam is combined from two beam parts which enables height adjustment of the overall height of the beam, thereby to a certain degree enabling compensation for dimensional inaccuracies on the blade shells. However, the beam parts still need to be adhered to each other and therefore there are, also in that case, problems associated with excess adhesive from the adhesive joints. In the disclosure the so-called joining panels are used that are mounted on the body parts extending across the joining surface, but with a slot there between into which a part of the excess adhesive may then flow. This method corresponds to the use of the above-mentioned adhesive traps and is associated with the same drawbacks.

It is known eg from WO 03046394 to avoid burrs of out-flowing adhesive by providing particular configurations of the adhesive faces of the one or both structural parts, into which excess adhesive may flow. However, this presupposes a mechanical processing of the joining faces, which considerably increases the costs of the adhesion process. Moreover, such grooves or cutouts will be able to take up only a certain amount of adhesive, and hence out-flowing adhesive cannot be entirely obviated if the adhesive joint is to compensate eg for large tolerances and inaccuracies on the constituent parts and ensuing very varying needs for adhesive.

OBJECT AND DESCRIPTION OF THE INVENTION

It is thus an object of the invention to provide a solution to the above-mentioned problem of excess and out-flowing adhesive.

In accordance with the invention this is accomplished by an element comprising at least two parts that are adhered together, wherein at least one porous layer is at least partially comprised in and at least partially protrudes from the adhesive joint between the parts and takes up excess adhesive outside the adhesive joint.

A porous layer as used herein and in the following is to be understood as a layer filled with pores, holes or openings, thereby imparting a more or less open structure to the layer. A porous layer may thus eg have a mesh-like or tangled structure (which may both be random and organised) and/or an open-cell structure like a sponge.

By using one or more such layers in an adhesive joint the advantageous aspect is accomplished that the extra and superfluous adhesive is absorbed or retained by the porous layer and hence contained at the adhesive joint without braking off at a later stage. The porous material may simultaneously serve as reinforcement of the adhesive and hence it may also contribute to enhancing the adhesive joint. Furthermore, hereby a thinner and more easy-flowing adhesive can be applied which is more easily pumped and which may thereby increase the speed of the adhesion process. Moreover, the element according to the invention is advantageous in that it is not necessary to provide particular configurations or processing procedures of the joining faces of the parts, since the porous layer can be configured with such high flexibility that it is easily deformed to follow the shape of the adhesive face. Simultaneously a layer of porous material may fill and adapt to adhesive joints of varying thicknesses, quite simply by being pressed suitably towards each other during the adhesion procedure.

According to one embodiment of the invention, the element comprises a porous layer which is at least partially pre-impregnated with adhesive. Hereby good control is accomplished, in a simple manner, of, on the one hand, where the adhesive is situated and, on the other, how much has been distributed. A pre-impregnated material layer is also simple and expedient to place on the one or both joining faces and the location of the layer can be controlled accurately by simple means.

According to one embodiment the porous layer has the structure of a sponge (with open pores) or mesh-like structure. These materials are advantageous in being able to yield only slight resistance to the distribution of the adhesive, while simultaneously working by taking up and retaining and reinforcing the adhesive in the material.

According to a further embodiment the porous layer comprises a fibre felt. Such felt can be manufactured at low production costs from a variety of different fibre materials.

According to yet an embodiment the porous layer is manufactured from a fibre material, such as eg glass fibres, plastics fibres or natural fibres, which materials are advantageous by having a reinforcing effect on the adhesive joint.

Moreover the invention relates to a blade for a wind turbine comprising an element as described above. The advantages thereof are as described above.

Moreover the invention relates to a method of joining at least two parts by adhesion, said method comprising the step of arranging at least one porous layer at least partially in and at least partially protruding from the adhesive joint for taking up excess adhesive outside the adhesive joint.

Finally the invention also relates to a method of joining at least two parts in accordance with the above by adhesion, and further comprising the step of removing an outer protective layer from the porous layer prior to the porous layer being arranged at least partially in the adhesive joint. For instance, the protective layer may be silicon-coated tear-ff film as known from various types of tape.

BRIEF DESCRIPTION OF THE DRAWING

In the following the invention will be described with reference to the figures, wherein.

DESCRIPTION OF EMBODIMENTS

Figure 1:
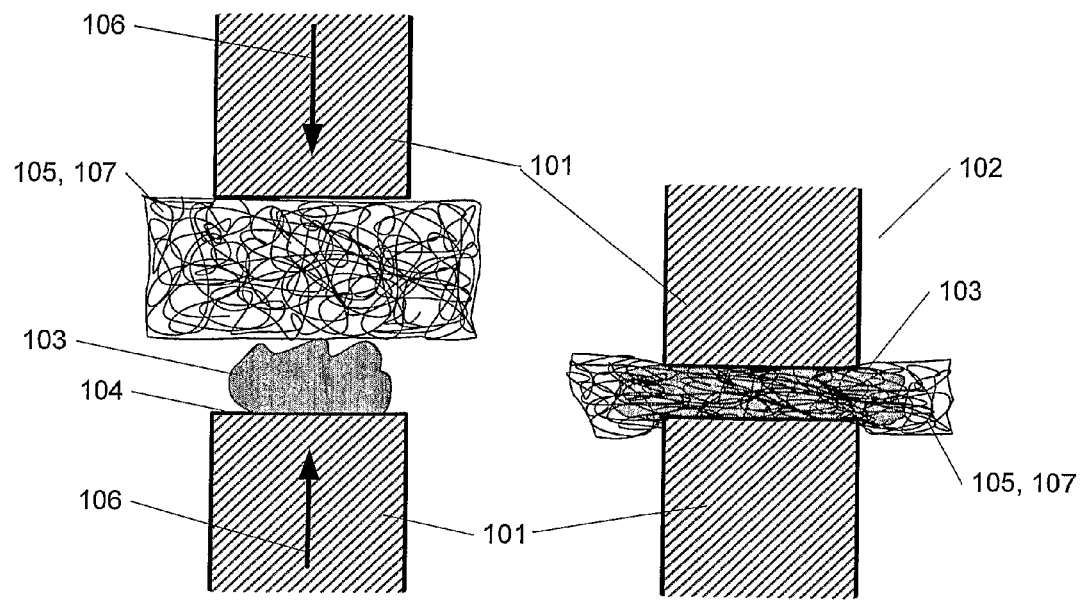
FIG. 1 shows the adhering together of two elements with a porous layer in the adhesive joint prior to and following adhesion.

FIG. 1 shows two parts 101 of a structure joined by adhesion to one element 102. To the left, the parts 101 are shown prior to being combined, and to the right the finished, adhered element 102 is shown. The adhesive 103 is applied, like in an ordinary adhesion process, onto one or both joining faces 104, following which a layer of a porous material 105 is arranged between the adhesive faces, and the parts are pressed together as illustrated by arrows 106. In order to accomplish a strong adhesive joint, it is important that a sufficient amount of adhesive is applied, which is ensured in the simplest and most expedient manner by applying generous amounts. Commonly, and if possible, the excess adhesive pressed out to the sides is removed when the parts are pressed together. This is done both for aesthetic considerations and for functional considerations, to the effect that the burrs of adhesive do not break off at a later stage and cause inconvenience. According to the present invention, that problem is solved, however, by the porous layer of material 105, through and into which the excess adhesive flows. Following finished adhesion the excess adhesive is thus taken up and retained by the adhesive joint of the porous material 105 as illustrated to the right in FIG. 1, and thus the adhesive will not at a later stage be able to break or fall off.

The layer 105, adhered integrally with the element, has to be of such structure that the adhesive is able to penetrate through the layer without significant resistance and be secured therein. This is accomplished by an embodiment of the invention in which a mesh-like structure 107 is used, as illustrated in FIG. 1. For instance, the material may be manufactured as a fleece or a mat of fibres, eg glass fibres, plastics fibres and/or natural fibres. The structure of the fibres may be disorganized, as will result from techniques known from felting and curling, and being known eg from various filter elements. Alternatively the fibres can be woven or knitted in an organised three-dimensional structure as known eg from distribution meshes for injection moulding.

Figure 2:
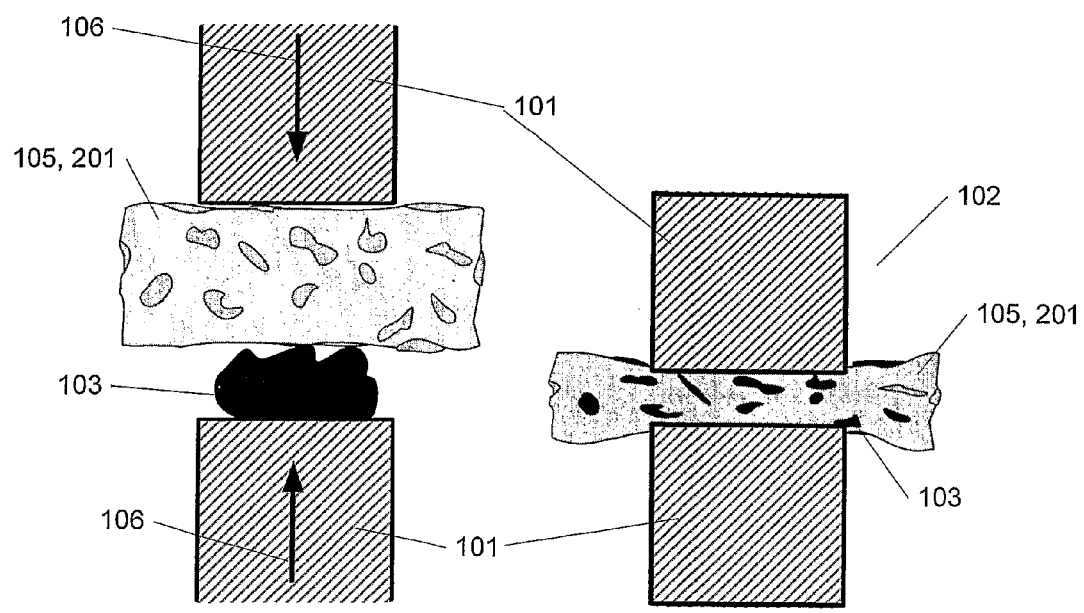
FIG. 2 shows the adhering together of two elements with a layer of sponge-like structure in the adhesive joint prior to and following adhesion.

FIG. 2, like FIG. 1, shows the comparison of two parts 101 prior to (to the left) and following adhesion (to the right). This embodiment uses a layer of material 105 in the adhesive joint which is, like in FIG. 1, porous, but having here a material structure like a sponge with open pores 201. Like the mesh-like structure 107 of the previous Figure, such material allows the adhesive 103 to penetrate through the layer 105, 201 and join both parts 101 to one element 102 simultaneously with the excess amount of adhesive being pressed out of the adhesive joint being taken up and contained in the layer 105.

It is thus a characterizing feature of the material layer according to the invention that it is porous, ie comprises a number of pores, holes or openings, or, in other words, it has an open structure. Hereby the adhesive is able to completely or partially penetrate into and/or through the material layer and to a certain degree be contained by the material. Examples of such porous material elements with open structures are the layers mentioned and illustrated above having a mesh-like structure (such as eg a sponge). The adhesive may be secured by the layer of material through the completely structural and mechanical resistance encountered by the adhesive in the material. Likewise, the material layer may be perceived to absorb a portion of the adhesive, and/or some chemical reaction may take place between the material layer and some or all of the adhesive.

Needless to say, the material layer used does not have to have the same structure throughout, but it may eg have a denser or solid impenetrable structure exteriorly along the edges. This may be advantageous, since, in that case, the outermost edges of the layer may thus serve to stop the adhesive from being pressed completely out of the material layer and run off. Alternatively the material layer may have a more solid core that may serve to impart a predetermined, fixed minimum thickness to the adhesive joint, if desired.

Apart from retaining the excess amount of adhesive from the adhesive joint, the porous layer 105 may further have a reinforcing effect and increase the strength of the adhesive joint.

Figure 3:
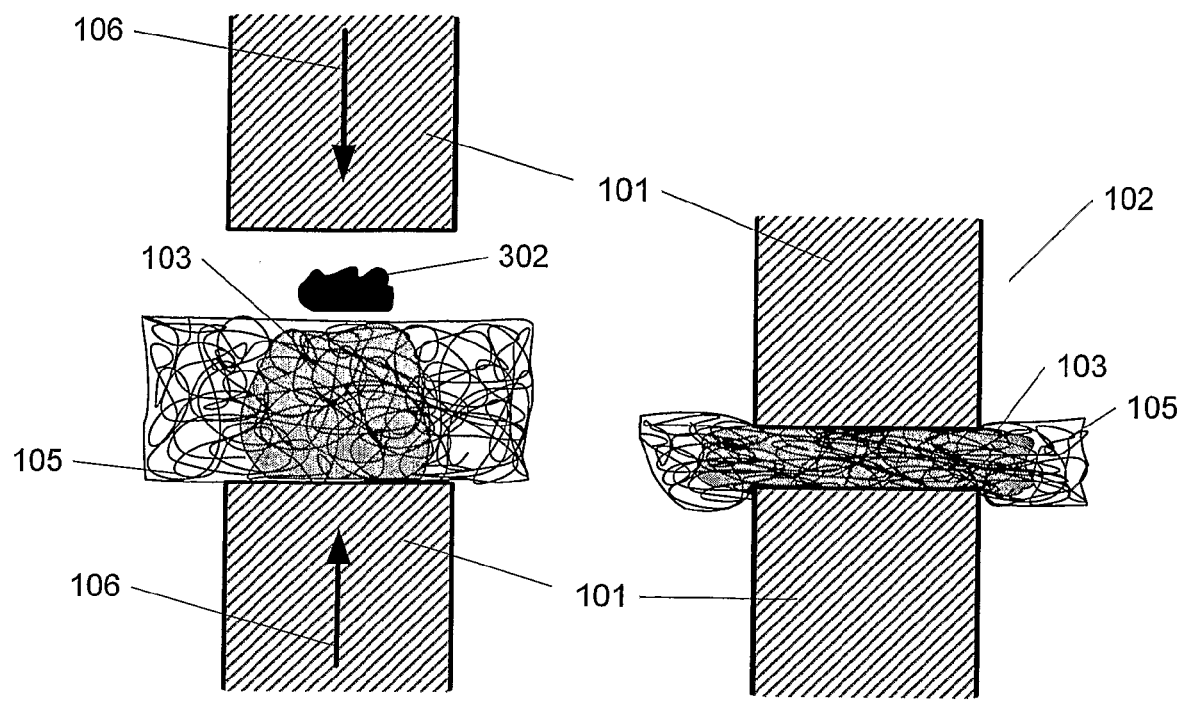
FIG. 3 shows an adhesive joint with a porous layer pre-impregnated with adhesive prior to and following adhesion.

FIG. 3 illustrates a further embodiment of the invention, wherein the porous layer 105 is pre-impregnated with adhesive 103 in a portion of the mat or layer. During the assembly process, the mat is positioned directly on the one joining face, following which a curing agent 302 is applied immediately prior to the parts 101 being pressed together. Like in the above-mentioned embodiments, the adhesive 103 will penetrate through the porous layer 105, and the excess adhesive will be received in the material. Moreover the porous layer may be preimpregnated with a ready-made adhesive mixture which is released for curing eg by an outermost protective layer being peeled off the layer 105 just prior to arrangement on the joining surface 104, by heat or in other known manner.

Figure 4:
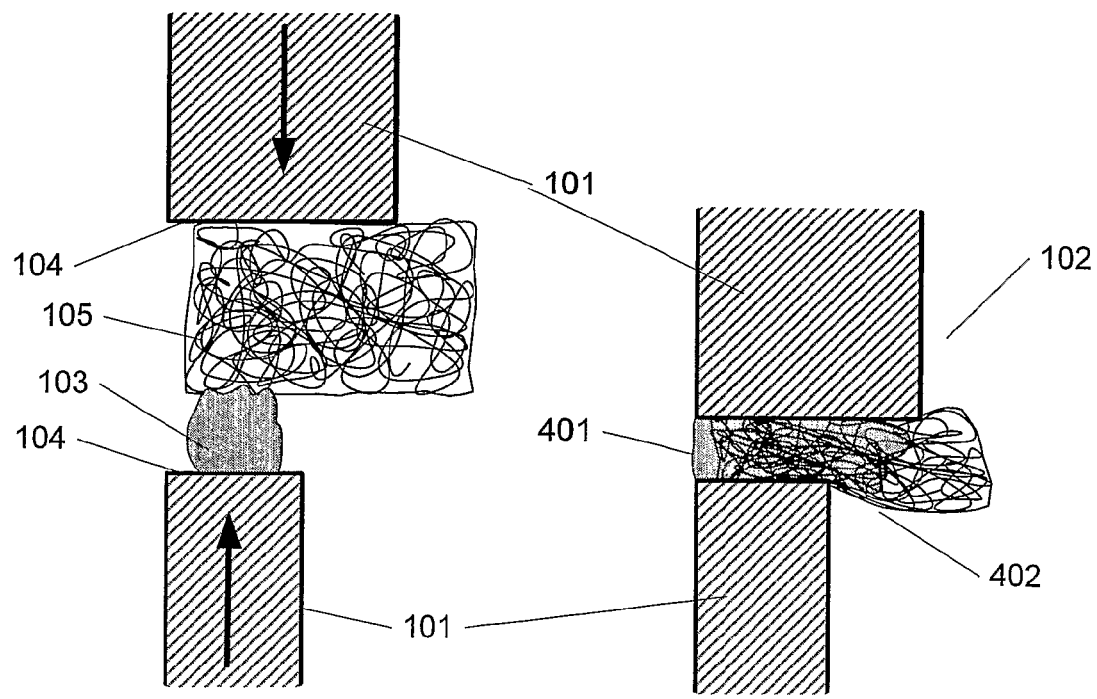
FIG. 4 shows an adhering together of two elements with adhesive faces of dissimilar dimensions prior to and following adhesion.

By some element shapes, such as completely or partially closed elements, it may be advantageous if excess adhesive is removed from the one side of the adhesive joint 401, but received and contained in a porous layer 105 on the other side 402 of the adhesive joint, eg if that side is difficult to access. Then the porous layer 105 may, according to one embodiment, be arranged in the adhesive joint to the effect that it protrudes only to the one side as illustrated in FIG. 4. How much the porous material 105 is to protrude from the adhesive joint depends on how large amounts of adhesive one wishes to make sure can be taken up by the material. By adhesion of parts made with large tolerances, the thickness of the adhesive joint may vary considerably along a joint, and the amount of excess adhesive will therefore also vary. In that case the layer of porous material must be wide enough for all the excess adhesive, where the adhesive joint is narrowest, to be taken up by the material. The figure also shows that the assembly method is not limited to adhering together constituent parts 101 with joining faces 104 of same dimensions, but may also be used on constituent parts having different dimensions.

Figure 5:
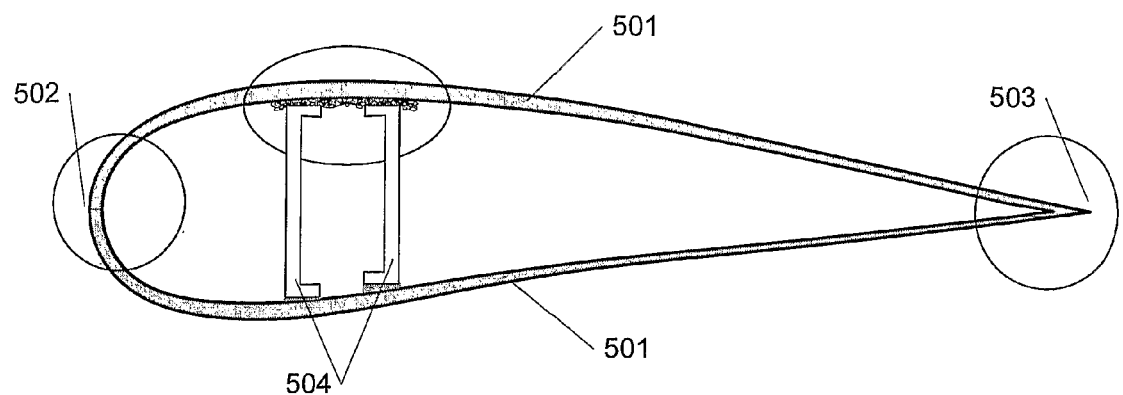
FIG. 5 is a cross-sectional view of a blade for a wind turbine.

FIG. 5 outlines the cross-section of a blade for a wind turbine. The outlined blade is made from two blade shells 501 of fibre-reinforced laminates. The blade shells are joined by adhesion along the fore edge 502 and the rear edge 503 of the blade. Interiorly, the blade is braced by means of a number of beams 504. When the blade is assembled the beams 504 are first secured by adhering onto the lowermost blade shell. Here excess adhesion can easily be removed from the adhesive joints. However, that is not the case when the uppermost blade shell is to be attached by adhesion. At the outer adhesive joints along fore and rear edges the excess adhesive is removed, whereby a smooth blade surface is ensured, which is important to the aerodynamic properties of the blade. At the interior joints at fore and rear edges at the top of the beams, a porous material according to the invention is advantageously used for collecting the excess amount of adhesive, since this would otherwise collect at the adhesive joints in large burrs. As mentioned above, it is possible that they break off at a later stage and rattle around within the blade due to commonly occurring strains in the blade when it yields and works in operation. At the beam joints in particular, the problem is major since, at this point, extra large amounts of adhesive are applied to take into consideration the comparatively large variations in thickness of the adhesive joints that may occur as a consequence of even small inaccuracies in the location of the beams. The adhesive joints at the fore and rear edges of the blades and at the top of the beams are shown in greater detail in FIGS. 6-8.

Figure 6:
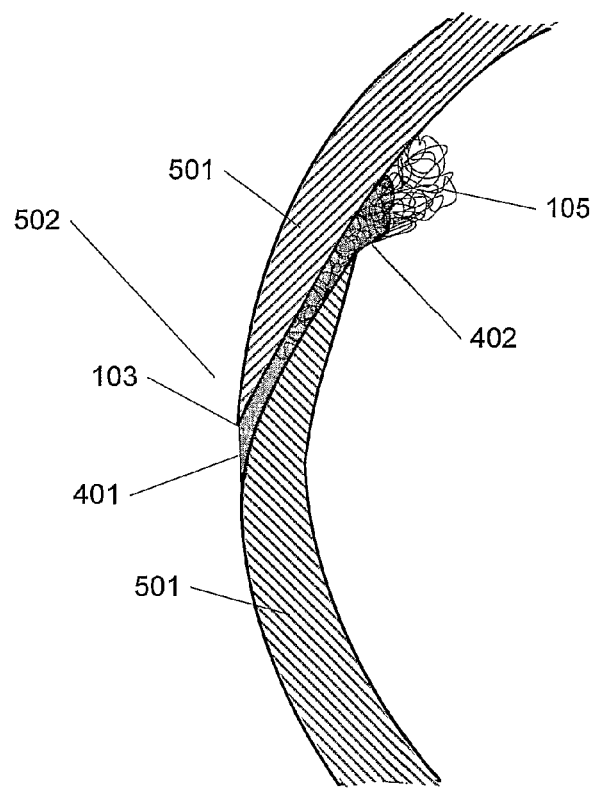
FIG. 6 shows the adhesive joint at the fore edge of a blade for a wind turbine in greater detail.

A possible adhesive joining of the fore edge of the blade 502 according to one embodiment of the invention is shown in FIG. 6. The two blade shells 501 terminate askew to accomplish a stronger joint. Interiorly of the adhesive joint 402 and protruding into the blade interior sits a layer of material 105 having a mesh-like structure, which on the one hand reinforces the adhesive and, on the other, takes up and retains that part of the excess adhesive 103 that was pressed out from the inner side of the adhesive joint. On the outside 401 excess adhesive is removed to the effect that the blade outside is smooth and has optimal aerodynamic properties.

Figure 7:
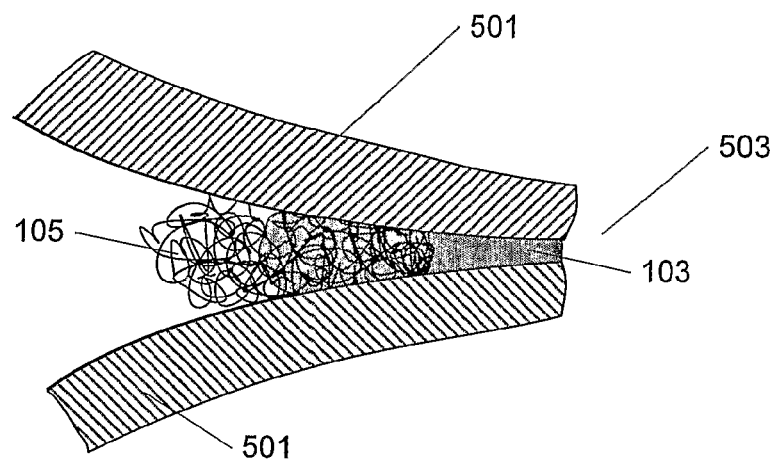
FIG. 7 shows the adhesive joint at the rear end of a blade for a wind turbine in greater detail.

Correspondingly is undertaken at the rear edge 503 of the blade as shown in FIG. 7. Between the adhesive faces of the blade shells 501 a porous material 105 is accommodated which, interiorly of the blade, takes up the excess adhesive 103 from the adhesive joint.

Figure 8:
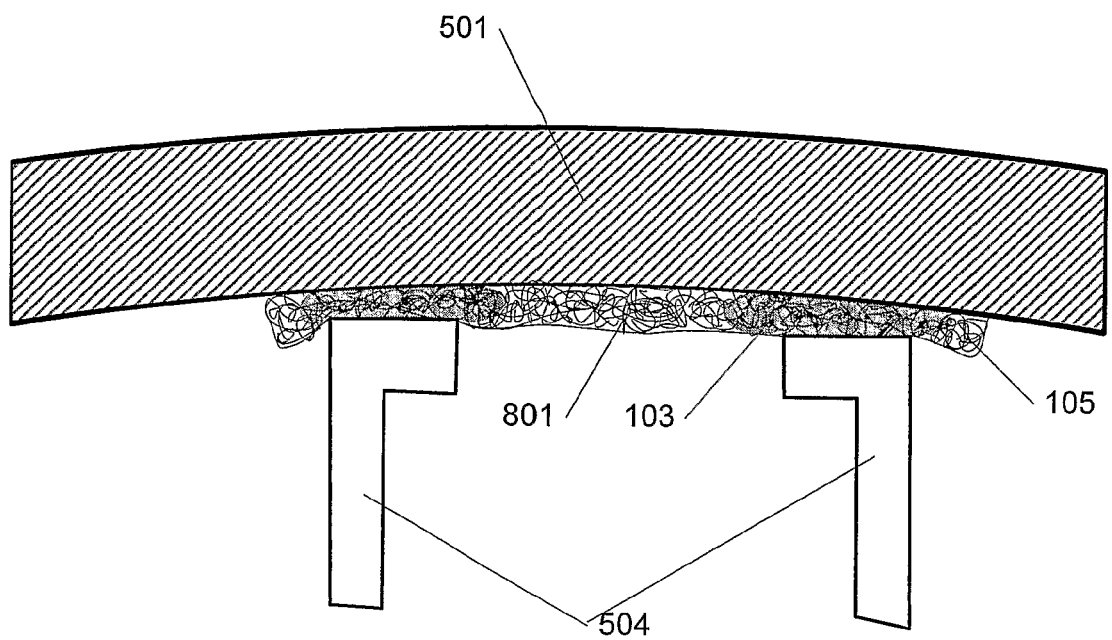
FIG. 8 shows the adhesive joints at the top of the bracing beams of a blade of a wind turbine in greater detail.

Finally, FIG. 8 shows the adhesive joint between the beams 504 and the uppermost blade shell 501. Here a layer of porous material 105 is also arranged between the parts to be assembled, through which material the adhesive 103 is able to penetrate while encountering comparatively little resistance, fill the adhesive joint and simultaneously retain the excess adhesive 103. Like in the other examples, the excess adhesive is thus prevented from flowing down and out into the blade interior or to remain set in large burrs. In the embodiment shown, a wide mat 801 of a porous material 105 sits on top of both beams 504. Instead of one wide mat, a smaller piece of material can be used for each separate beam part, depending on what is considered to be the easiest solution from a process point of view and the simplest to handle.

Figure 9:
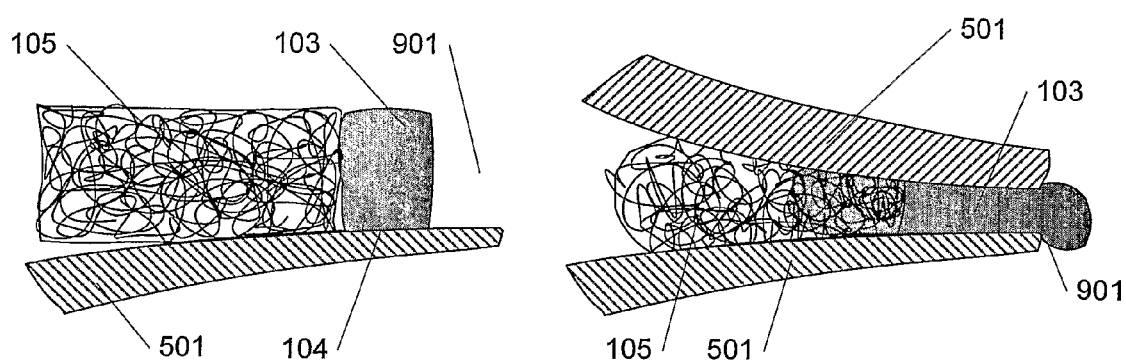
FIG. 9 shows an adhesive joint prior to and following assembly with a porous layer used as technical aid.

A further field of use for the porous layer according to the invention is illustrated in FIG. 9. Here an adhesive joint is shown—in this case at the blade tip 901—prior to (to the left) and following assembly (to the right). On the joining face 104 of the one blade shell 501, the porous material 105 is arranged a distance from the outermost edge of the blade shell and arranged such that it can be used as to control the laying of the adhesive 103. Moreover the thickness of the porous material in non-compressed state can be dimensioned such that it can be used as scale and technical aid in determining and controlling the optimal dosage of adhesive. When the adhesive is laid in an amount corresponding to the height of the porous material, the sufficient and requisite amount is thus deposited. The laying of the adhesive is hereby simplified and controlled with considerable improvement, both with respect to the location and the adhesive dosage.

It will be understood that the invention as disclosed in the present description and figures can be modified or changed while continuing to be comprised by the protective scope of the following claims.

The invention claimed is:

1. A wind turbine blade comprising:
   at least two parts of the wind turbine blade which are connected at a joint by at least one porous layer, which contacts the at least two parts, and which is impregnated with adhesive;
   wherein the at least one porous layer is at least partially comprised in and at least partially protrudes from the joint connecting the at least two parts; and
   wherein the porous layer is impregnated by the adhesive layer from absorption thereof while joining the at least two parts, whereby the porous layer takes up excess adhesive outside the joint.

2. The wind turbine blade of claim 1, wherein the porous layer has a structure of a sponge with open pores.

3. The wind turbine blade of claim 1, wherein the porous layer has mesh structure.

4. The wind turbine blade of claim 1, wherein the porous layer comprises a felt of fibres.

5. The wind turbine blade of claim 1, wherein the porous layer comprises a fibre material selected from the group consisting of glass fibres, plastics fibres and natural fibres.

* * * * *